United States Patent [19]

Hashimoto et al.

[11] Patent Number: 4,958,917

[45] Date of Patent: Sep. 25, 1990

[54] ELECTROCHROMIC DEVICE FOR CONTROLLING TRANSMITTANCE OF LIGHT

[75] Inventors: Chikara Hashimoto, Omiya; Hiroshi Inaba, Matsusaka; Kiyoshi Nakase, Mie; Yukitoshi Yanagida, Matsusaka, all of Japan

[73] Assignee: Central Glass Company, Limited, Ube, Japan

[21] Appl. No.: 299,418

[22] Filed: Jan. 23, 1989

[30] Foreign Application Priority Data

Jan. 29, 1988 [JP] Japan ................... 63-9684[U]

[51] Int. Cl.$^5$ ............................................. G02F 1/01
[52] U.S. Cl. ............................................. 350/357
[58] Field of Search ......................................... 350/357

[56] References Cited

U.S. PATENT DOCUMENTS

| 4,749,260 | 6/1988 | Yang et al. | 350/357 |
| 4,773,741 | 9/1988 | Inaba et al. | 350/357 |
| 4,801,195 | 1/1989 | Kawai et al. | 350/357 |

FOREIGN PATENT DOCUMENTS

| 0122518 | 1/1983 | Japan | 350/357 |
| 59-159134 | 9/1984 | Japan . | |

OTHER PUBLICATIONS

Kirkman et al. "Sealing a Flat Display Device", IBM Technical Disclosure Bulletin, vol. 21, No. 7, Dec. 1978, pp. 3021-3022.

*Primary Examiner*—Eugene R. LaRoche
*Assistant Examiner*—Michael B. Shingleton
*Attorney, Agent, or Firm*—Fleit, Jacobson, Cohn, Price, Holman & Stern

[57] ABSTRACT

The invention relates to an electrochromic (EC) device for controlling transmittance of light, such as a window pane or a filter for a display. The EC device has a double-decker structure produced by superposition of two identical EC cells each having two oppositely arranged EC electrodes one of which is formed of a first EC material that takes on color in oxidized state, such as Prussian blue, and the other of a second EC material that takes on color in reduced state such as $WO_3$. The EC device has a transparent inner substrate with an EC electrode layer using one of the first and second EC materials on each side thereof and two transparent outer substrates each with an EC electrode layer using the other of the first and second EC materials. There is a peripheral seal between the inner substrate and each outer substrate, and the space defined between the inner substrate and each outer substrate is filled up with an electrolyte liquid. To minimize the number of leads for application of voltages to the four EC electrode layers, the EC electrode layers on the both sides of the inner substrate are connected with each other by an angled strip of a sheet metal fitted on the inner substrate, and the EC electrode layers on the outer substrates are connected with each other by another angled strip of a sheet metal fitted into a marginal region of the space between the two outer substrates.

3 Claims, 1 Drawing Sheet

ELECTROCHROMIC DEVICE FOR CONTROLLING TRANSMITTANCE OF LIGHT

BACKGROUND OF THE INVENTION

This invention relates to an electrochromic device of a board form which is for controlling transmittance of light therethrough. More particularly, the device herein concerned with is a board produced by superposition of two electrochromic cells each of which utilizes a combination of an electrochromic material that takes on color in its electrochemically oxidized state and another electrochromic material that takes on color in its electrochemically reduced state.

It is known to use an electrochromic (EC) device in the form of a board as a device for controlling transmittance of light therethrough, such as a window pane or a filter for CRT or fluorescent displays.

Also it is known to use a combination of the aforementioned two types of EC materials in an EC device of board form having oppositely arranged two electrode layers. In operation of the EC device, electrochemical oxidation of the EC material on one electrode is accompanied by electrochemical reduction of the EC material on the opposite electrode. Accordingly simultaneous coloration of the two electrode layers and simultaneous bleaching of the two electrode layers take place. The primary purpose of this construction is intensifying coloration of the display device. For example, JP-A No. 59-159134 shows an EC display device of such a construction.

In the case of an EC device for controlling transmittance of light therethrough it is desired that the lowest level of transmittance which can be reached by coloration of the device be as low as possible. However, even when a combination of the aforementioned two types of EC materials is employed it was difficult to obtain an EC device that can reduce its transmittance of visible light to less than 7%. It is possible to further decrease transmittance of visible light by providing a colored filter to the EC device. However, when the EC device is bleached the filter becomes an obstacle to realization of a desirably high transmittance. This is very inconvenient particularly when the EC device is used as a window pane.

As a means to obtain a light transmittance controlling EC device which becomes sufficiently low in transmittance by coloration, we have proposed in Japanese Utility Model application No. 62-164908, filed Oct. 28, 1987 (not published yet), a double-decker device produced by superposition of two EC cells each of which uses a combination of an EC material that takes on color in oxidized state and another EC material that takes on color in reduced state.

In practice the double-decker structure offers an inconvenience in that the total number of leads increases. That is, the EC device must have at least four leads since the device includes four EC layers each formed on a transparent electrode layer spaced from the others. Furthermore, each EC cell in this device often includes an auxiliary electrode for use in an initial reduction treatment of one of the EC layers, and in such a case six leads extend from the EC device. The process of manufacturing the EC device includes sealing peripheral regions of each EC cell with an elastomeric sealant, and at that stage the large number of leads are liable to get entangled. Besides, an increased area of contact between the leads and the sealant causes degradation of airtightness of the EC device.

SUMMARY OF THE INVENTION

It is an object of the present invention to provide an electrochromic device for controlling transmittance of light, which device has the aforementioned doubledecker structure and is improved in airtightness and also in the ease of providing leads and applying sealant in producing the device.

The present invention provides an electrochromic (EC) device for controlling transmittance of light through, which comprises a transparent inner substrate with a transparent electrode layer coated on each side thereof, first and second EC layers which are formed on the electrode layers on the two opposite sides of the inner substrate, respectively, and are formed of one of a first EC material which takes on a characteristic color in its electrochemically oxidized state and a second EC material which takes on a characteristic color in its electrochemically reduced state, a transparent first outer substrate which is coated with a transparent electrode layer and is arranged opposite to and spaced from the inner substrate such that the electrode layer of the outer substrate faces the first EC layer, a transparent second outer substrate which is coated with a transparent electrode layer and arranged opposite to and spaced from the inner substrate such that the electrode layer of the second outer substrate faces the second EC layer, and third and fourth EC layers which are formed on the electrode layer on the first outer substrate and the electrode layer on the second outer substrate, respectively, and are formed of the other of the first and second EC materials. Both of the first and second outer substrates are slightly wider than the inner substrate. The EC device further comprises peripheral seal means for holding the inner substrate and the two outer substrates in the opposite and spaced arrangement and airtightly defining a first space between the inner substrate and the first outer substrate and a second space between the inner substrate and the second outer substrate, an electrolyte liquid which fills up the first space and the second space, a first connector which is an angled strip of a sheet metal having two parallel leg portions and is fitted on the inner substrate such that the two leg portions are respectively fixed to the transparent electrode layers on the two opposite sides of the inner substrate, a second connector which is an angled strip of a sheet metal having two parallel leg portions and is fitted into a marginal region of the space between the first and second outer substrates such that the two parallel leg portions are respectively fixed to the transparent electrode layer on the first outer substrate and the transparent electrode layer on the second outer substrate, a first lead which extends outward from the first connector through the seal means, and a second lead which extends outward from the second connector.

As will be understood from the above statement, an EC device according to the invention is constructed by superpositon of two identical EC cells each of which uses a combination of an EC material that takes on color in oxidized state, e.g. Prussian blue, and another EC material that takes on color in reduced state, e.g. $WO_3$. Therefore, by coloration the EC device becomes very low in transmittance of visible light and by bleaching resumes high transparency.

In this EC device the first type of EC layers on the inner substrate are connected to each other by the first connector, and the second type of EC layers on the respective outer substrates are connected to each other by the second connector. By devising so, only a pair of leads suffice for oxidizing and reducing the two pairs of EC layers in the device. When the EC device has an auxiliary electrode in each of the two EC cells, this invention includes connecting the two auxiliary electrodes with each other by a thin conductor through the seal means and extending only one additional lead from the thin conductor. Since the total number of leads is thus decreased there is little possibility of entangling of the leads at the operation of applying the sealant in producing the EC device, and the EC device is improved in airtightness. Since the outer substrates are made slightly wider than the inner substrate the second connector can easily be inserted and can firmly be fixed, and a widened opening is provided for introducing the sealant, and airtight sealing is augmented. The angled shape of the two connectors offer convenience for attachment and fixing of these connectors. Preferably these connectors are formed of a sheet of a spring metal for further easing attachment and fixing.

EC devices according to the invention are useful in various windows and doors or as filters for CRT and other displays.

DESCRIPTION OF THE PREFERRED EMBODIMENTS

Figure 1:
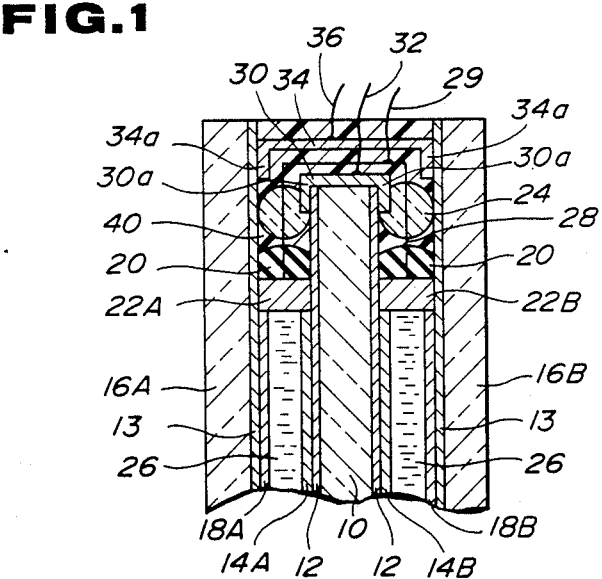
FIG. 1 is a partial and sectional view of an EC board as an embodiment of the invention.
Figure 2:
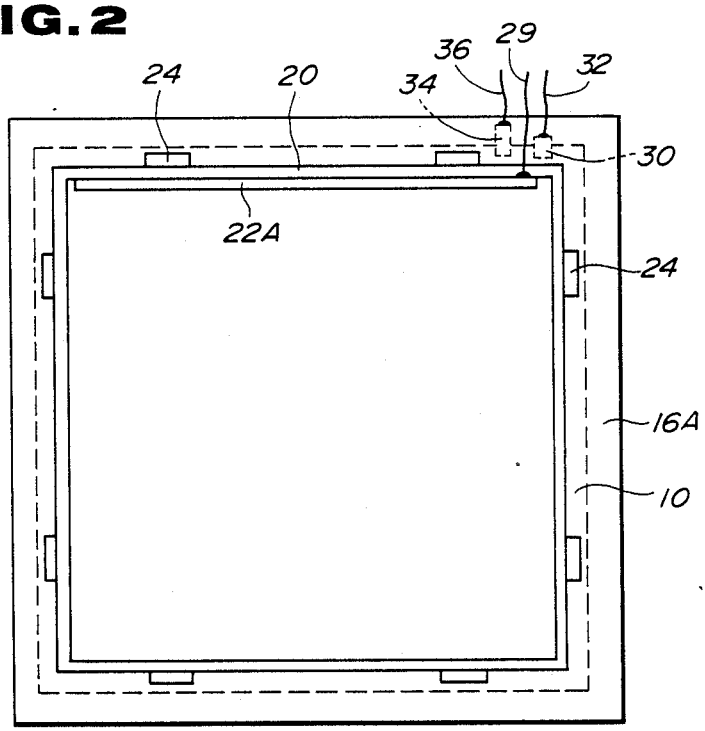
FIG. 2 is a plan view of the EC board of FIG. 1.

FIGS. 1 and 2 show an EC device according to the invention for controlling light transmission. The EC device is in the form of a board and is comprised of two sets of EC cells superposed upon each other.

The EC board has a transparent inner substrate 10 with a transparent and conductive film 12 coated on each side thereof. As an element of the first EC cell an EC layer 14A is formed on the conductive film 12 on one side, and as an element of the second EC cell another EC layer 14B is formed on the conductive film 12 on the opposite side. Both of these two EC layers 14A and 14B are formed of a first EC material that assumes a characteristic color in an electrochemically oxidized state. The two EC layers 14A and 14B are arranged symmetrical with respect to the substrate 10.

Spaced from and parallel to the inner substrate 10, there are first and second transparent outer substrates 16A and 16B opposite to the aforementioned two EC layers 14A and 14B, respectively. The inner surface of each of the outer substrates 16A, 16B is coated with a transparent and conductive film 13. There is an EC layer 18A on the conductive film 13 of the first outer substrate 16A over the area opposite to the EC layer 14A on the inner substrate 10, and another EC layer 18B on the conductive film 13 of the second outer substrate 16B over the area opposite to the EC layer 14B on the inner substrate 10. Both of these two EC layers 18A and 18B are formed of a second EC material that assumes a characteristic color in an electrochemically reduced state.

Usually each substrate 10, 16A, 16B is a glass plate, but it is also possible to use a different material such as a synthetic resin plate high in transparency. If desired, any of the substrates 10, 16A, 16B may be a laminated plate.

A typical example of the first EC material which takes on color in an oxidized state is Prussian blue, viz. a complex represented by the formula $Fe_4^{III}[Fe^{II}(CN)_6]_3$, and other practicable examples are $Rh(OH)_x$ (reddish brown), $Ir(OH)_x$ (black), $Ni(OH)_x$ (bright blue) and osmium purple represented by the formula $Fe_4^{III}[Os^{II}(CN)_6]_3$. A typical example of the second EC material which takes on color in a reduced state is $WO_3$ (blue), and other practicable examples are $TiO_2$ (grayish green), $MoO_3$ (blue), $Nb_2O_5$ (dark blue), mixture of $WO_3$ and Au (red) and mixture of $WO_3$ and $MoO_3$(black). A desired combination of the first and second EC materials can be employed.

When Prussian blue is employed as the first EC material it is convenient to make the EC layers 14A and 14B Prussian blue layers because the two layers 14A, 14B can simultaneously be formed by an electrolytic deposition operation. However, in any case it is free to alternatively use the second EC material for the EC layers 14A and 14B.

An auxiliary electrode 22A is disposed in a side marginal region of the space between the inner substrate 10 and the first outer substrate 16A, and another auxiliary electrode 22B in a side marginal region of the space between the inner substrate 10 and the second outer substrate 16B. Both of the two auxiliary electrodes 22A, 22B are insulated from the conductive films 12 and 13, though the insulation is not illustrated, and these two electrodes 22A and 22B are connected to each other by a thin conductor 28. The purpose of including these auxiliary electrodes 22A, 22B will be described hereinafter.

The space between the inner substrate 10 and the first outer substrate 16A and the space between the inner substrate 10 and the second outer substrate 16B are each peripherally sealed with an inner seal layer 20. Each of the sealed spaces between the inner substrate 10 and the outer substrates 16A, 16B is filled with an electrolyte liquid 26. Each of the auxiliary electrodes 22A, 22B is ionically conductive with the electrolyte liquid 26.

On a side of the rectangular inner substrate 10, an angled connector 30 formed of a sheet metal, preferably a sheet of a spring metal, is fitted on so as to make tight contact with the conductive films 12 on the two opposite sides of this substrate 10. A lead 32 extends outward from this connector 30.

Numeral 24 indicates spacers such as cylindrical glass rods inserted to keep a predetermined distance between the inner substrate 10 and each of the outer substrates 16A, 16B.

In this device the outer substrates 16A, 16B are somewhat wider than the inner substrate 10. On a side of the rectangular device an angled connector 34 formed of a sheet metal, preferably a sheet of a spring metal, is fitted into a laterally outermost region of the space between the first and second outer substrates 16A and 16B so as to make tight contact with the conductive films 13 of the respective substrates 16A, 16B. A lead 36 extends outward from this connector 34. The peripherally outermost regions of the space between the two outer substrates 16A and 16B are filled up with an outer seal material 40. Numeral 29 indicates a lead which is connected to the conductor 28 connecting the two auxiliary electrodes 22A and 22B.

For normal use of the EC board of the above construction, the two sets of EC cells in the board are simultaneously driven by using the lead 32 connected to the inner connector 30 and the lead 36 connected to the outer connector 34. By application of a suitable DC voltage between the two leads 32 and 36 it is possible to electochemically oxidize the EC layers 14A and 14B and, simultaneously, electrochemically reduce the EC layers 18A and 18B. Then all the EC layers take on color whereby the EC board lowers in light transmittance. By application of a suitable DC voltage of the reverse polarity it is possible to electrochemically reduce the EC layers 14A and 14B and, simultaneously, oxidize the EC layers 18A and 18B. Then all the EC layers lose color and becomes high in transparency so that the EC board becomes high in light transmittance.

EXAMPLE

An EC board of the construction shown in FIGS. 1 and 2 was produced. The inner substrate 10 was a transparent glass plate 390 mm × 390 mm in widths and 2 mm in thickness. The outer substrates 16A, 16B were transparent glass plates 400 mm × 400 mm in widths and 2 mm in thickness. Each of the transparent conductive films 12 and 13 was an ITO film deposited by sputtering.

Each of the EC layers 14A, 14B on the inner substrate 10 was a film of Prussian blue, which assumes blue color in an oxidized state, formed by an electrolytic synthesis and deposition method with masking on the peripheral marginal region of the conductive film 12. The Prussian blue film had a thickness of about 4000 Å. Each of the EC layers 18A, 18B on the outer substrates 16A, 16B was a film of $WO_3$, which assumes blue color in a reduced state, formed by sputtering with masking on the peripheral marginal region of the conductive film 13. The $WO_3$ film had a thickness of about 4000 Å.

Each of the auxiliary electrodes 22A, 22B was produced by kneading a mixture of polytriphenylamine powder, carbon powder and a binder, press-shaping the kneaded mixture and providing an ion permeable insulation covering to the shaped body. A titanium wire or a stainless steel wire was used as the thin conductor 28, and both end portions of the wire 28 were embedded in the two auxiliary electrodes 22A, 22B, respectively, at the stage of press-shaping these electrodes.

The first outer substrate 16A was placed with the EC layer 18A upside, and, as the inner seal 20, a butyl rubber base adhesive was applied onto the conductive film 13 so as to surround the EC layer 18A. At this operation a thin tube (not shown) was inserted through the seal material 20 to use the tube for subsequently injecting the electrolyte liquid 26 into the space between the $WO_3$ film 18A and the Prussian blue film 14A. Along one side of the square EC layer 18A the auxiliary electrode 22A was tightly inserted between the EC layer 18A and the seal material 20. As the spacers 24, short pieces of cylindrical glass rods having a diameter of 1 mm were disposed in an arrangement as illustrated in FIG. 2 and brought into tight contact with the laterally outer surface of the inner seal 20.

The angled connector 30 was formed by bending a strip of a phosphor bronze sheet at a right angle at two sections so as to make two parallel legs 30a. The lead 32 was soldered to the connector 30. Then the angled connector 30 was fitted on the inner substrate 10, and the two legs 30a of the connector were respectively soldered to the conductive films 12 on the both sides of the substrate 10. By the attachment of the connector 30 the Prussian blue films 14A and 14B on the inner substrate 10 were electrically connected with each other via the conductive films 12. After that the inner substrate 10 was placed on the peripheral seal 20 provided on the first outer substrate 16A and pressed toward the outer substrate 16A until the thickness of the seal 20 became equal to the diameter of the cylindrical glass rods 24. As a result the inner substrate 10 was provisionally fixed to the first outer substrate 16A by the seal 20.

Next, on the opposite side of the inner substrate 10 the auxiliary electrode 22B, inner seal material 20 (butyl rubber base adhesive) and spacers 24 (glass rods) were disposed in the same manner as the disposition of the counterparts on the first outer substrate 16A. Also at this operation a thin tube (not shown) was inserted through the seal material 20 for subsequent injection of the electrolyte liquid 26. Then the second outer substrate 16B was placed, with the EC layer 18B downside, on the peripheral seal 20 and pressed toward the inner substrate 10. As a result the outer substrate 16B was provisionally fixed to the inner substrate 10 by the seal 20 with the spacing determined by the spacers 24.

The angled connector 34 was formed by bending a strip of a phosphor bronze sheet at a right angle at two sections so as to make two parallel legs 34a. The lead 36 was soldered to the angled connector 34. Then the conncector 34 was fitted into the space between the two outer substrates 16A and 16B, and the two legs 34a of the connector 34 were respectively soldered to the conductive films 13 on the two substrates 16A, 16B. By the attachment of the connector 34 the two $WO_3$ films 18A and 18B were electrically connected with each other via the conductive films 13. The lead 29 was connected to the titanium wire 28 connecting the two auxiliary electrodes 22A and 22B.

As the outer seal 40, Thiokol rubber, a polysulfide rubber, was injected into the peripheral space between the two outer substrates 16A and 16B. Using the aforementioned thin tubes, the electrolyte liquid 26 was injected into the space between the $WO_3$ film 18A and the Prussian blue film 14A and the space between the $WO_3$ film 18B and the Prussian blue film 14B. The electrolyte liquid was 1 mol/liter solution of $LiClO_4$ in propylene carbonate. After that the thin tubes were extracted, and the remaining holes were filled up with the Thiokol rubber.

In the thus produced EC device, all the EC layers 14A, 14B, 18A, 18B as formed were in oxidized state. That is, the Prussian blue films 14A, 14B assumed blue color, and the $WO_3$ films 18A, 18B were colorless. Therefore, there was the need of electrochemically reducing either the Prussian blue films 14A, 14B or the $WO_3$ films 18A, 18B prior to actual operation of this EC device. For example, the Prussian blue films 14A, 14B were reduced (i.e. bleached) by applying a DC voltage between the lead 29 connected to the auxiliary electrodes 22A, 22B and the lead 32 connected to the conductive films 12 via the connector 30 with the auxiliary electrodes 22A, 22B positive electrode and the conductive films 12 negative electrode. By this treatment the Prussian blue films 14A, 14B turned colorless and transparent, whereby the EC board as a whole became transparent. Besides the use for the initial reduction treatment, the auxiliary electrodes 22A, 22B are of use for refreshing the EC layers in the board when a balance between oxidation and reduction is disturbed by repeated coloration and bleaching.

After the above reduction treatment, a DC voltage of 1 V was applied between the lead 32 and the lead 36 with the conductive films 12 (Prussian blue films 14A, 14B) positive electrode and the conductive films 13

(WO₃ films 18A, 18B) as negative electrode. Then, in about 180 sec both the Prussian blue films 14A, 14B and the WO₃ films 18A, 18B took on blue color clearly and uniformly over the entire area of every EC film. In this state visible light transmittance of the EC board was only about 3%, so that the board was effective as a shading board. Next, a reverse DC voltage of 0.5 V was applied between the two leads 32 and 36. Then, in about 180 sec complete and uniform bleaching took place over the entire area of every EC layer, whereby the EC board turned into a transparent board which exhibited visible light transmittance of about 65%.

It was possible to stably repeat the coloration and bleaching of this EC board, and even though there were some changes in the atmospheric pressure neither leakage of the electrolyte liquid 26 nor intrusion of the air into the electrolyte liquid 26 took place.

What is claimed is:

1. An electrochromic device for controlling transmittance of light, comprising:
    a transparent inner substrate with a transparent electrode layer coated on each side thereof;
    first and second electrochromic layers which are formed on the electrode layers on the two opposite sides of said inner substrate, respectively, and are formed of one of a first electrochromic material which takes on a characteristic color in its electrochemically oxidized state and a second electrochromic material which takes on a characteristic color in its electrochemically reduced state;
    a transparent first outer substrate which is coated with a transparent electrode layer and is arranged opposite to and spaced from said inner substrate such that the electrode layer of the outer substrate faces the first electrochromic layer, the outer substrate being dimensioned larger than said inner substrate;
    a transparent second outer substrate which is coated with a transparent electrode layer and is arranged opposite to and spaced from said inner substrate such that the electrode layer of the second outer substrate faces the second electrochromic layer, the second outer substrate being dimensioned larger than said inner substrate;
    third and fourth electrochromic layers which are formed on said electrode layer on said first outer substrate and said electrode layer on said second outer substrate, respectively, and are formed of the other of said first and second electrochromic materials;
    a first peripheral seal formed of a butyl rubber base adhesive composition disposed in the space between the inner substrate and each of the first and second outer substrates so as to hold the inner substrate and the first and second outer substrates in the opposite and spaced arrangement and airtightly define a first space between the inner substrate and the first outer substrate and a second space between the inner substrate and the second outer substrate and forming a peripheral gap between the first and second outer substrates, a peripheral region of the inner substrate protruding into said peripheral gap;
    an electrolyte liquid which fills up said first space and said second space;
    a first connector which is an angled strip of a sheet metal having two parallel leg portions and is fitted on said inner substrate such that said two parallel legs are respectively fixed to the transparent electrode layers on the two opposite sides of said inner substrate;
    a second connector which is an angled strip of a sheet metal having two parallel leg portions and is fitted into a marginal region of the space between said first and second outer substrates such that said two parallel leg portions are respectively fixed to the transparent electrode layer on said first outer substrate and the transparent electrode layer on said second outer substrate;
    a second seal formed of polysulfide rubber filling said peripheral gap such that said first connector and at least said leg portions of said second connector are embedded in the second seal;
    a first lead which extends outward from said first connector through said first and second seals; and
    a second lead which extends outward from said second connector.

2. A device according to claim 1, wherein each of said sheet metal of said first connector and said sheet metal of said second connector is resilient.

3. A device according to claim 1, further comprising a first auxiliary electrode which is disposed in a marginal region of said first space and is insulated from the transparent electrode layers on said inner substrate and said first outer substrate, a second auxiliary electrode which is disposed in a marginal region of said second space and is insulated from the transparent electrode layers of said inner substrate and said second outer substrate, a thin conductor which connects said first and second auxiliary electrodes with each other through said first and second seals, and a third lead which extends outward from said thin conductor.

* * * * *